United States Patent
Sen et al.

(10) Patent No.: US 11,036,726 B2
(45) Date of Patent: Jun. 15, 2021

(54) GENERATING NESTED DATABASE QUERIES FROM NATURAL LANGUAGE QUERIES

(71) Applicant: International Business Machines Corporation, Armonk, NY (US)

(72) Inventors: Jaydeep Sen, Bangalore (IN); Karthik Sankaranarayanan, Bangalore (IN); Diptikalyan Saha, Bangalore (IN); Manasa Jammi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 16/120,588

(22) Filed: Sep. 4, 2018

(65) Prior Publication Data

US 2020/0073983 A1    Mar. 5, 2020

(51) Int. Cl.
*G06F 16/242* (2019.01)
*G06F 16/21* (2019.01)
*G06F 16/2455* (2019.01)

(52) U.S. Cl.
CPC .......... *G06F 16/243* (2019.01); *G06F 16/212* (2019.01); *G06F 16/2456* (2019.01)

(58) Field of Classification Search
None
See application file for complete search history.

(56) References Cited

U.S. PATENT DOCUMENTS 9,183,511 B2    11/2015  Li et al.
2016/0012105 A1  1/2016  Chang et al.
2017/0177715 A1  6/2017  Chang et al.
2018/0181613 A1  6/2018  Acharya et al.

OTHER PUBLICATIONS

Wikipedia, "Correlated subquery", pp. 1-2 (Year: 2016).*
M. Mony et al., "An Overview of NLIDB Approaches and Implementation for Airline Reservation System," International Journal of Computer Applications, Dec. 2014, pp. 36-41, vol. 107, No. 5.
T. Finelli et al., "Semantic Search in Relational Databases," Worcester Polytechnic Institute, https://web.wpi.edu/Pubs/E-project/Available/E-project-121516.../MQP3.pdf, Dec. 15, 2016, 41 pages.
F. Li et al., "NaLIR: An Interactive Natural Language Interface for Querying Relational Databases," Proceedings of the ACM SIGMOD International Conference on Management of Data (SIGMOD), Jun. 22-27, 2014, pp. 709-712.
N. Yaghmazadeh et al., "SQLizer: Query Synthesis from Natural Language," Proceedings of the ACM on Programming Languages, Jan. 2017, Article No. 63, 25 pages, vol. 1, No. 1.
V. Zhong et al., "SEQ2SQL: Generating Structured Queries from Natural Language Using Reinforcement Learning," arXiv:1709.00103v7, Nov. 9, 2017, 12 pages.

* cited by examiner

*Primary Examiner* — Amresh Singh
(74) *Attorney, Agent, or Firm* — Ryan, Mason & Lewis, LLP

(57) ABSTRACT

Systems and methods are provided for generating nested queries from natural language queries. In particular, system and methods are provided to implement natural language interfaces to databases (NLIDB) frameworks which are configured to apply intelligent reasoning over domain semantics to detect and generate nested queries across different domains without the need for domain specific training or utilizing domain-specific semantic templates for mapping a natural language query to a structured query.

20 Claims, 5 Drawing Sheets

GENERATING NESTED DATABASE QUERIES FROM NATURAL LANGUAGE QUERIES

TECHNICAL FIELD

This disclosure relates generally to data processing systems and, more particularly, to systems and methods for generating nested queries from natural language queries.

BACKGROUND

Relational databases are queried using database query languages such as Structured Query Language (SQL). Natural language interfaces to databases (NLIDB) are systems that translate a natural language query sentence into a database query. NLIDB systems allow a user to directly communicate with a database by inputting a natural language query in the form of a natural language question, wherein the NLIDB system translates the natural language query into an appropriate SQL query by natural language processing (or linguistic processing) the query to determine linguistic information, and mapping/correlating the linguistic information of the natural language query into SQL elements using an associated database schema. The challenges to natural language query processing include, for example, properly interpreting the natural language sentence, removing ambiguity in the linguistic information, and mapping the linguistic information to the appropriate context. Various approaches to natural language query processing include pattern matching, syntactic parsing, semantic grammar formulation, machine learning, and ontologies.

Database syntaxes such as SQL are complex, and may require aggregation, nesting, various types of joins, etc., as well as detailed knowledge of the underlying database schema. One significant challenge in natural language query processing involves accurately generating nested SQL queries from natural language queries. A nested SQL query (or subquery or inner query) is an SQL query that is contained within another SQL query and embedded within a "Where" clause. The ability to correctly generate a nested SQL query from a natural language query is a highly non-trivial task for various reasons. For example, a nested query within a natural language query is hard to detect. Indeed, there is a diverse set of categories of natural language queries that can lead to nested queries. In addition, nested SQL queries are difficult to generate. Indeed, generating proper nested queries requires complex domain reasoning and implicit inferences based on the natural language phrasing and associated domain ontology.

Conventional NLIDB systems are not capable of properly detecting and generating nested queries from natural language queries. For example, "rule-based" systems are capable of handling point queries and basis aggregation, but can only handle a certain class of nested queries, i.e., if the natural language input query explicitly captures the different subqueries within the query. Indeed, rule-based systems cannot properly detect nested query classes based on implicit intent (based on word understanding) and target query semantics. Further, machine learning (ML)-based systems, which are trained over domain specific quality assurance (QA) data, are not adaptable to new domains. In addition, ML-based systems, which are configured to learn generic language patterns to identify correct SQL clauses, are extremely difficult to train, and not capable of learning to predict join paths, and thus, and not capable of properly formulating nested SQL queries.

SUMMARY

Embodiments of the invention generally include systems and methods for generating nested queries from natural language queries. In one embodiment, a computer-implemented method comprises: receiving a natural language query for obtaining information from a database; converting the natural language query into a semantic representation which comprises tokens that correspond to elements of a database schema of the database; processing the semantic representation of the natural language query using a reasoning engine to determine if the semantic representation of the natural language query comprises a nested query, and parsing the semantic representation of the natural language query into (i) an outer query portion and (ii) an inner query portion, in response to determining that the semantic representation of the natural language query does comprise a nested query; determining a class of the nested query and associating a class label to (i) the outer and (ii) the inner query portions of the semantic representation of the natural language query; determining (i) entities to be shared by (a) the inner and (b) the outer query portions, and (ii) a join condition to join the inner query portion to the outer query portion; and generating a database query to access the database, wherein the database query is representative of the natural language query, and wherein the database query is generated based on (i) the outer and inner query portions of the semantic representation of the natural language query, (ii) the associated class label, and (iii) a join clause corresponding to the join condition for joining for the outer and inner query portions of the semantic representation of the natural language query.

In another embodiment, a computer-implemented method comprises: receiving a natural language query for obtaining information from a database; parsing the natural language query into a set of tokens; mapping the tokens to ontology elements which represent schema elements of the database; performing a semantic parsing process to generate semantic information for the tokens, wherein the semantic information comprises (i) semantic type labels assigned to the tokens and (ii) token dependency information regarding determined dependencies between the tokens based on the semantic type labels; utilizing the semantic information of the tokens to determine that the natural language query comprises a nested query, and to determine a class type label of the nested query; utilizing (i) the semantic information of the tokens and (ii) the class type label of the nested query to determine a set of tokens which belong to an inner query portion and a set of tokens which belong to an outer query portion of the nested query, and a join condition to join the inner query portion and the outer query portion; generating a logical form of a nested database query based on (i) the inner query portion, (ii) the outer query portion, and (iii) the join condition; and generating a structured query language (SQL) nested database query based on the logical form of the nested database query.

Other embodiments will be described in the following detailed description of embodiments, which is to be read in conjunction with the accompanying figures.

DETAILED DESCRIPTION

Embodiments of the invention will now be discussed in further detail with regard to systems and methods for generating nested database queries from natural language queries. As explained in further detail below, embodiments of the invention comprise NLIDB frameworks which implement intelligent reasoning over domain semantics to detect and generate nested queries across different domains without the need for domain specific training or utilizing domain-specific semantic templates for mapping a natural language query to a structured query.

Figure 1:
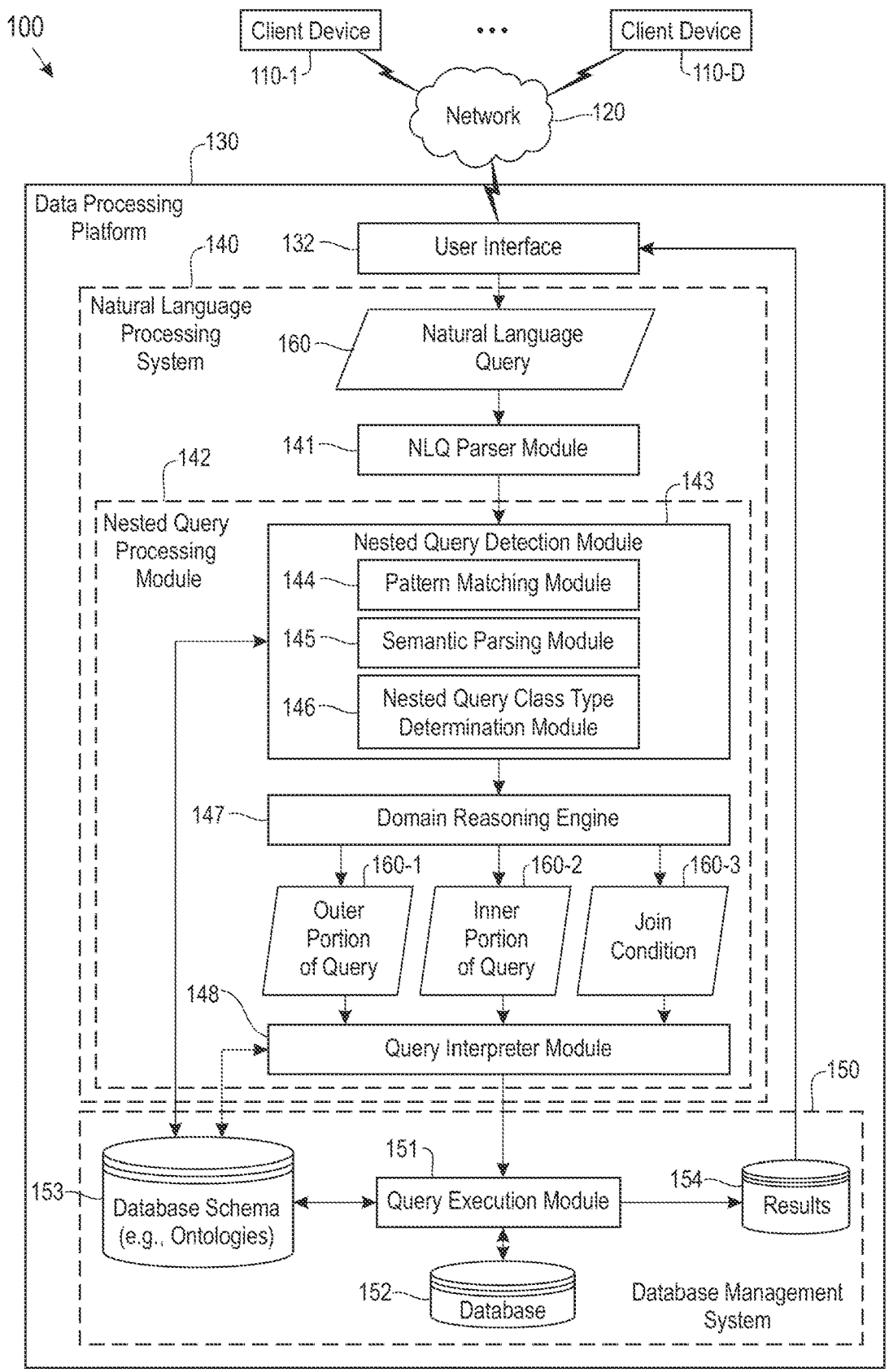
FIG. 1 schematically illustrates a system which comprises a data processing platform that is configured to generate nested queries from natural language queries, according to an embodiment of the invention.

FIG. 1 schematically illustrates a system which comprises a data processing platform that is configured to generate nested queries from natural language queries, according to an embodiment of the invention. In particular, FIG. 1 illustrates a system 100 comprising a plurality of client computing devices 110-1, . . . , 110-D (collectively, client devices 110), a communications network 120, and a data processing platform 130. The data processing platform 130 comprises a NLIDB system comprising a user interface 132 (or user portal), a natural language processing system 140, and a database management system (DBMS) 150. The natural language processing system 140 comprises a natural language query (NLQ) parser module 141, and a nested query processing module 142. The nested query processing module 142 comprises a nested query detection module 143, which comprises a pattern matching module 144, a semantic parsing module 145, and a nested query class type determination module 146. The nested query processing module 142 further comprises a domain reasoning engine 147 and a query interpreter module 147. The DBMS 150 comprises a query execution module 151, an information database 152, a database schema 153, and a query results datastore 154. The functions of the natural language processing system 140 and the database management system 150 (and their constituent data processing modules) will be explained in further detail below.

The client devices 110 include various types of computing systems or devices such as desktop computers, servers, smart phones, electronic tablets, laptop computers, etc., which are utilized by end-users to access the data processing platform 130 over the communications network 120, and submit natural language queries to access information from the information database 152. The communications network 120 may comprise any type of communications network (or combinations of networks), such as a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks.

While the data processing platform 130 is generically illustrated in FIG. 1 for illustrative purposes, it is to be understood that the natural language processing system 140 and the database management system 150 (and constituent modules thereof) may be distributed over a plurality of computing nodes (e.g., a cluster of servers, virtual machines, etc.) that collectively operate to implement the data processing platform 130 and the associated functions described herein. In addition, the datastores for the information database 152, the database schema 153, and the query results 154 may be implemented using any suitable type of data storage system or combination of data storage systems, including, but not limited to storage area network (SAN) systems, direct attached storage (DAS) systems, a serial attached storage (SAS/SATA) system, as well as other types of data storage systems comprising clustered or distributed virtual and/or physical infrastructure. In one embodiment, the data processing platform 130 may be implemented in a data center or a cloud computing platform that performs data computing and data storage functions, etc., to provide database services for various end users, service providers, and/or organizations. In another embodiment, the data processing platform 130 may be a business intelligence (BI) system that utilizes the database 152 to store business related information for a given business or enterprise.

The data processing platform 130 can be implemented using one of various types of NLIDB systems in which in which a natural language query is translated to a database query. For example, in one embodiment, the database management system 150 comprises a software-based relational database management system (RDBMS) to maintain the database 152 as a relational database. In this embodiment, the database management system 150 utilizes a SQL framework for querying and maintaining data within the information database 152. The user interface 132 (or front-end service portal) is configured to implement device interfaces that enable the computing devices 110 to connect and communicate with the data processing 130, as well as graphical user interfaces that enable end-users (or service customers) to register with, and access database services provided data processing platform 130.

The natural language processing system 140 implements methods that are configured to interpret a natural language query over a domain ontology to generate a logical query (e.g., nested query) which represents the natural language query. The logical query is input to the DBMS 150 where the logical query is translated into a database query (e.g., SQL query) and executed to obtain information from the information database 152. For example, as shown in FIG. 1, a natural language query 160 (which is received or otherwise generated by the user interface 132) is input to the NLQ parser module 141. The natural language query 160 comprises a textual natural language sentence that is input from a user operating a client device 110, or a speech-to-text transcription of a spoken query received by a user operating a client device 110. In this regard, the natural language processing system 140 may include a speech recognition system to convert voice queries into textual queries.

The NLQ parser module 141 implements methods that are configured to parse the natural language query 160 and generate a parse tree representing a linguistic understanding of the natural language query 160. More specifically, in one embodiment, the NLQ parser module 141 performs a morphological analysis to partition the natural language query 160 into word tokens and identify morphemes (i.e., prefix, stem, suffix, punctuations, etc.) for each word. In addition, the NLQ parser module 141 performs a syntactic analysis to construct a parse tree which groups related words (e.g., phrases, clauses, etc.) and identifies a relationship between the word groups as noun phrases, verb phrases, prepositional phrases, etc. The nested query processing module 142 receives as input the parse tree representation of the natural language query 160 generated by the NLQ parser module 141, as well as metadata of the database schema 153 (e.g., domain ontology information), and then performs various functions to determine if the natural language query 160 comprises a nested query and a class type of the nested query, and then generates a logical query representation of the natural language query 160 for processing by the DBMS 150.

More specifically, the pattern matching module 144 implements methods that are configured to identify a set of tokens (e.g., words) within the parse tree presentation of the natural language query 160 which are relevant to formulating a database query, and to match (or otherwise map) each token (in the set of tokens) to an ontology element of an ontology representation of the database schema. In other words, the pattern matching module 144 processes the parse tree representation of the natural language query 160 in view domain knowledge (e.g., domain ontology) of the database schema 153 to map the information in the parse tree to corresponding ontology elements, which essentially serves to map the linguistic information of the natural language query 160 to database schema elements.

The semantic parsing module 145 implements methods that are configured to determine, for each token in the set of tokes, which property of the ontology element the given token corresponds to. For instance, a given token mapped to a given ontology element can correspond to, e.g., a numerical property, an instance value, an entity concept, a date-type concept, etc. In addition, the semantic parsing module 145 parses the tokens of the given query to determine dependencies between tokens of the given query. The semantic parsing module 145 annotates each token within the set of tokens (corresponding to the given query) with a semantic annotation that identifies the "semantic type" of the given token.

The nested query class type determination module 146 implements methods that are configured to utilize the semantic information of the tokens for the given query to determine if the given query comprises a nested query, and if so, to determine a class type of the nested query. The following describes different class types of nested queries which can be detected and processed by the nested query processing module 142, according to an exemplary embodiment of the invention.

Class 1: A NOT operator applied to an entity type, i.e., a concept. For example, a class 1 nested query may be: "Name all the executives in Company A who are not common insiders."

Class 2: A COUNT operator applied on entities with a condition on an aggregation result of an aggregate function. For example, a class 2 nested query may be: What is the number of Companies generating average revenues more than 1 billion in 2017?

Class 3: All possible entity retrievals based on a condition satisfying an aggregation result. For example, a class 3 nested query may be: "Show me stocks having highest traded value in 2018."

Class 4: An Entity equality enforced by two different subparts of the query. For example, a class 4 nested query may be: "Show me everyone who bought and sold the same stock."

Class 5: Entity inequality enforced by two different subparts of the query. For example, a class 5 nested query may be: "Who purchased Company A stock in one account and sold it in another account?"

Class 6: Comparing results between two subqueries. For example, a class 6 nested query may be: "Show me transactions of IBM stock for a price less than the average selling price."

Class 7: Comparison between the same entity from two subqueries. For example, a class 7 nested query may be: "Who purchased stock in 2016 which has gone up in value?" (absolute). As another example, a class 7 nested query may be: Who purchased stock in 2016 which has gone up by 50% in value?" (relative).

The nested queries that fall under classes 6 and 7 perform a comparison with a non-literal target value. There are challenges to accurately detecting nested queries within the above classes of natural language queries and generating proper nested SQL queries.

For example, it is problematic to identify the specific entity or set of entities for the individual subqueries, wherein segregating tokens from a certain position is problematic. By way of example, in the exemplary natural language query "Show me everyone who bought and sold the same stock", there is (i) an outer query: {Who, Bought, Stock}, (ii) an inner query: {Who, Sold, Stock}, (iii) an implicit Join: Stock.nameIN, and (iv) an implicit parameter sharing: Person.name(who). In this example, the "who" must be carried into the inner query as well, and domain reasoning methods according to embodiments of the invention would be utilized to determine that the transactions "bought" and "sold" are performed by a person ("who").

In addition, it is problematic to identify the join between the outer and inner results as the join entity and the condition can change depending on what specific subquery it is in. For example, in the exemplary natural language query "Show me everyone who bought stocks that have gone up in value", there is (i) an outer query: {Who, bought, stock, value}, (ii) an inner query: {Stock, value}, (iii) an implicit join: Stock.last traded value >Stock.Transaction value, and (iv) an implicit parameter sharing: Stock.name. In this example, the property to compute stock value changes under the reasoning that the stock value of the transaction is different than the current value of the stock.

By way of further example, in the natural language query "List all managers who are also customers", there is (i) an outer query: {Managers}, (ii) an inner query: {Customers}, and (iii) an implicit join: Manager.name=customer.name. In this example, the join concept changes under the reasoning that managers and customers can still be linked (i.e., children) of a Person entity.

Furthermore, it is problematic to identify implicit parameter shares between outer and inner results. For example, in the exemplary natural language query "Who all bought more IBM stocks than they sold in 2017?" there is (i) an outer query: {who, bought, IBM, stock, in 2017}, (ii) an inner query: {he, sold, IBM, in 2017}, (iii) an implicit join: Count(Stock)>Count(Stock), and (iv) implicit parameter sharing: Person.name. In this example, the terms "IBM, in 2017" are shared across both queries under the reasoning that a specific instance value (e.g., IBM) mentioned for the comparison Entity (Stock) should be shared across both queries. In addition, the Time phrase of the inner query is applied to the outer query.

In the above exemplary queries, there is no general linguistic pattern to address the above-noted challenges. In this regard, embodiments of the invention apply rules based on intelligent reasoning over domain semantics to detect and generate nested queries across different domains without the need for domain specific training or utilizing domain-specific semantic templates for mapping a natural language query to a structured query.

The domain reasoning engine 147 implements methods that are configured to perform deep semantic reasoning grounded on domain intelligence to identify subqueries (e.g., outer and inner query portions) of a given query comprising a nested query, and a join condition for the subqueries. In particular, as shown in FIG. 1, the domain reasoning engine 147 receives as input the processing results (e.g., nested query class label) from the nested query class type determination module 146, and parses the set of tokens into different portions of the given query, e.g., into an outer portion 160-1 and an inner portions 160-2. In addition, the domain reasoning engine 147 is configured to determine an associated join condition (or join clause) which is utilized to join the sub queries when formulating a database query. As explained in further detail below, the domain reasoning engine 147 performs domain knowledge-based semantic reasoning on a set of tokens for a given natural language query to identify the outer and inner portions a given query for a wide variety of different types (classes) of nested queries, such as described above.

The query interpreter module 148 receives as input the processing results of the (e.g., the outer portion 160-1, the inner portion 160-2, the join condition 160-3) domain reasoning engine 147, and formulates a logical construct of a nested query based on the outer portion 160-1, the inner portion 160-2, and the join condition 160-3, which abstractly represents the natural language query 160. The logical form of the nested query is then output to the query execution module 151 of the DBMS 150. The query execution module 151 converts the logical form of the nested query into a proper SQL query, and executes the SQL query to access information from the information database 152. The query execution module 1541 stores the query results in the query results datastore 154, wherein the query results are accessed by the user or client device through the platform user interface 132.

Figure 2:
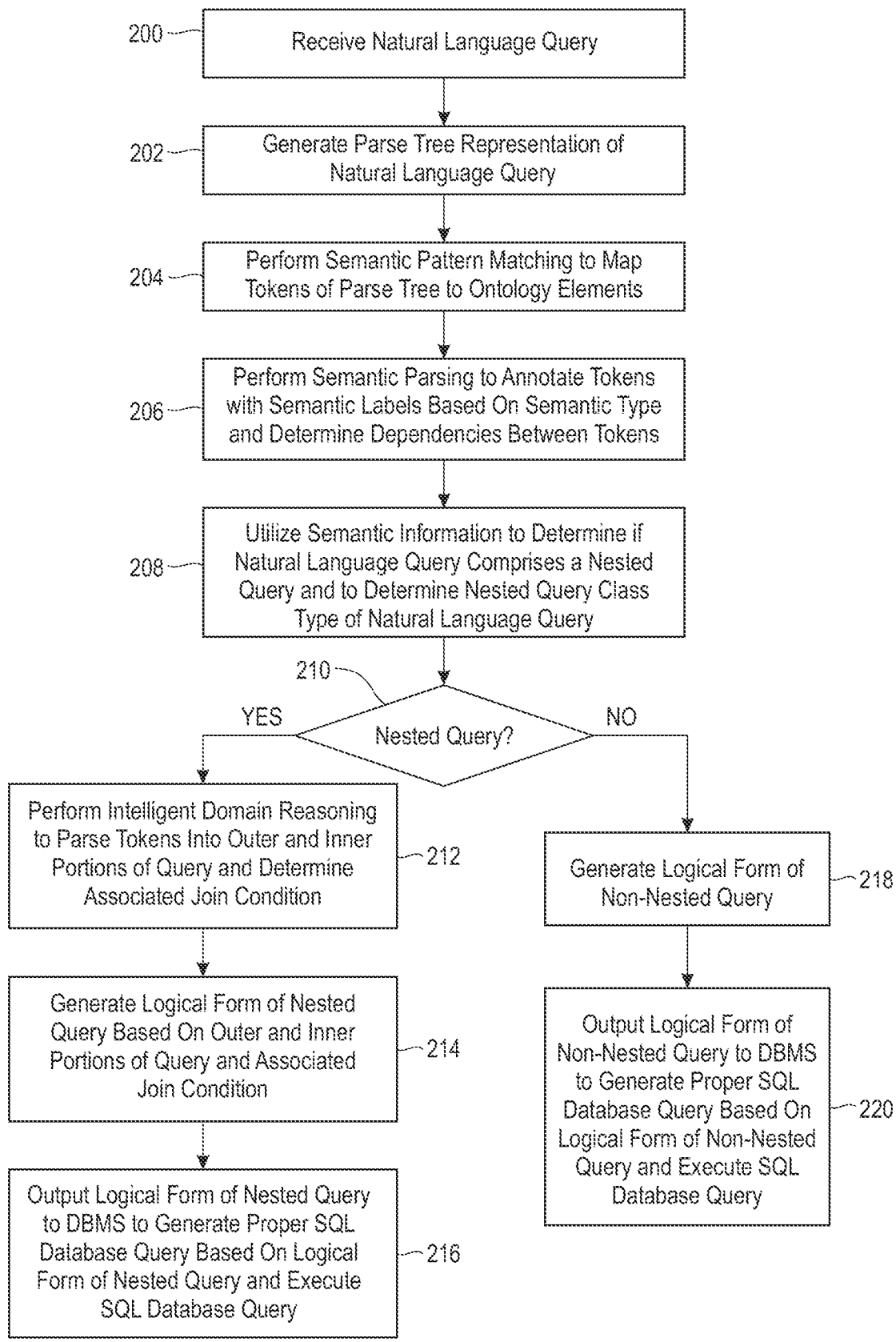
FIG. 2 is a flow diagram of a method for generating nested queries from natural language queries, according to an embodiment of the invention.

FIG. 2 is a flow diagram of a method for generating nested queries from natural language queries, according to an embodiment of the invention. In one embodiment, FIG. 2 illustrates an exemplary process flow which is executed by the various processing modules of the natural language processing system 140 of FIG. 1. Referring to FIG. 2, the natural language processing system 140 receives a natural language query (block 200) and generates a parse tree representation of the natural language query (block 202) via operation of the NLQ parser module 141. The nested query detection module 143 performs semantic pattern matching to map tokens of the parse tree representation into ontology elements (block 204) via operation of the pattern matching module 144.

A semantic parsing operation is performed (via operation of the semantic parsing module 145) to determine the semantic types of the tokens, annotate the tokens with appropriate semantic labels based on their determined semantic types, and to determine dependencies between tokens within the set of tokens for the given natural language query (block 206). The semantic information is then utilized by the nested query class type determination module 146 to determine if the natural language query comprises a nested query and, if so, to determine a nested query class type of the natural language query (block 208). If it is determined that the natural language query does comprise a nested query (affirmative determination in block 210), the process flow of blocks 212, 214 and 216 is performed. On the other hand, if it is determined that the natural language query does not comprise a nested query (negative determination in block 210), the process flow of blocks 218 and 220 is performed.

When the natural language query is determined to comprise a nested query, the domain reasoning engine 147 will perform intelligent domain reasoning and analysis on the semantically labelled set of tokens to parse the tokens into outer and inner portions of the query and determine an associated join condition for the outer and inner portions of the query, based on information regarding the identified nested query class type and based on various rules/conditions for intelligent interpretation of the semantically labeled set of tokens (block 212). The query interpreter module 148 will generate a logical form of the nested query based on the set of tokens associated with the outer and inner portions of the query, and the associated join condition, as determined by the domain reasoning engine 147 (block 214). The query interpreter module 148 will output the logical form of the nested query to the query execution module 151 of the DBMS 150 to generate a proper SQL database query based on the logical form of the nested query and execute the SQL database query (block 216).

When the natural language query is determined to be a non-nested query, the query interpreter module 148 will generate a logical form of the non-nested query (block 218). The query interpreter module 148 will output the logical form of the non-nested query to the query execution module 151 of the DBMS 150 to generate a proper SQL database query based on the logical form of the non-nested query and execute the SQL database query (block 220).

The following provides a more detailed explanation of exemplary processing operations (e.g., blocks 204, 206, and 208, FIG. 2) which are performed by the nested query detection module 143 (FIG. 1) according to an embodiment of the invention. As noted above, the nested query detection module 143 is configured to determine if a natural language query comprises a nested query and to determine a class type of the nested query. As part of this process, the nested query detection module 143 receives as input, set of tokens (Set<Token>tokens) in the parse tree corresponding to the natural language query, as well as domain ontology (O) (which corresponds to, or is otherwise mapped to, the elements of the database schema 153). The output of the nested query detection module 143 comprises (i) a nested query class label or (ii) a "no nested query" label.

As an initial phase, the nested query detection module 143 performs semantic parsing and annotates the elements of the parse tree (linguistic) representation of the natural language query, via operation of the pattern matching and semantic parsing modules 144 and 145. In particular, with this process, given the tokens in the parse tree, the pattern matching module 144 will determine a set of tokens (Set<Token>tokens) within the parse tree presentation of the natural language query 160 which are relevant to formulating a database query, and to match (or otherwise map) each token (in the set of tokens) to an ontology element of an ontology representation of the database schema. The semantic parsing module 145 will then implement methods that are configured to determine, for each token in the set of tokens, which property of the ontology element the given token corresponds to (i.e., Map<Token, OntologyElement>semanticMatches). The semantic parsing module 145 annotates each token within the set of tokens (corresponding to the given query) with a semantic annotation that identifies the "semantic type" of the given token.

By way of example, for each token (t) in the set of tokens, the pattern matching and semantic parsing modules 144 and 145 can apply the following rules to perform the semantic parsing and annotation operations:

(i) if t.text has "no" or "not", then semanticType(t)="not";

(ii) if t.text has "same" or "also" or "too", etc., then semanticType(t)="Equal";

(iii) if t.text has "another" or "different", etc., then semanticType(t)="NotEqual";

(iv) if t.text has aggregation keywords such as "total", "sum" "max", "min" "avg", then semanticType(t)="Aggregation";

(v) if t.text has text such as "more than", "gone up", "less than", "come down" etc., then semanticType(t)="comparison" (or similar meaning words);

(vi) if (semanticMatches.get(t) is a Numeric Property), then semanticType(t)="Numeric";

(vii) if (semanticMatches.get(t) is an Instance Value), then semanticType(t)="Instance";

(viii) if (semanticMatches.get(t) is an Entity Concept), then semanticType(t)="Entity"; and (ix) if (semanticMatches.get(t) is a DateType Concept), then semanticType(t)="Time".

It is to be understood that the above-noted words identified by the pattern matching module 144, such as "no" and "not", are merely exemplary and not an exhaustive list. For example, a given token (t) of the term "never" (or similar meaning words) can be identified by the pattern matching module 144 as being of the semanticType(t)="not".

Once the tokens are labeled with semantic labels (annotations), the semantic parsing module 145 will apply intelligent reasoning and analysis to determine dependencies that may exist between the semantically labeled tokens (e.g., Dependency<Token,Token>=SemanticParsing(q)).

Next, the nested query class type determination module 146 will utilize the semantic information of the tokens to determine if the given query comprises a nested query, and if so, to determine a class type of the nested query. The following describes exemplary rules and conditions that can be implemented by the nested query class type determination module 146 to detect and identify a nested query based on intelligent semantic reasoning.

Rule 1: If($\exists$t1 such that semanticType(t1)=="not" && semanticType(nextOf(t1))==Entity), then return nested query class type=Class 1.

Rule 2: If($\exists$t1 such that semanticType(t1)==count && $\exists$t2 such that semanticType(t2)==entity && $\exists$t3 such that semanticType(t3)=="comparison" && $\exists$t4 such that semanticType(t4)==aggregation && $\exists$ dependency(t1,t2) && $\exists$ dependency(t2,t4) && 3 dependency(t3,t4)), then return nested query class type=Class 2.

Rule 3: If($\exists$t1 such that semanticType(t1)==Entity && $\exists$t2 such that semanticType(t2)==aggregation && $\exists$ dependency(t1,t2) && positionOf(t1)<positionOf(t2)), then return nested query class type=Class 3.

Rule 4: If($\exists$t1 such that semanticType(t1) Comparison && semanticType(prev(t1)) Numeric):

if(semanticType(next(t1))==aggregation), then return nested query class type=Class 6;

else if(semanticType(next(t1))=="numeric" && $\exists$t2 such that semanticType(t2)=="Entity" && $\exists$ dependency(t2, prev(t1)) && $\exists$ dependency(t2,next(t1)), then return nested query class type=Class 7.

Rule 5: If(($\exists$t1 such that semanticType(t1) Equal|| Not Equal) && (semanticType(prev(t1))||semanticType(next (t1))=="Entity")):

If(semanticType(t1) Equal), then return nested query class type=Class 4, or

If(semanticType(t1) NotEqual), return nested query class type=Class 5.

Rule 6: If none of the above, then return "Not Nested".

It is to be understood that the pseudocode presented herein is readily understood by one of ordinary skill in the art, and a detailed explanation thereof is not needed. For illustrative purposes, for a given query, the above statement for "Rule 1" states that if there exists a given token t1 in the query which (i) is deemed to be equal to the semantic type "not" AND (ii) for which the next token (that comes after the given token t1 in the query) is deemed to be equal to the semantic type "Entity", then the given query is deemed to be a nested query of a class type "Class 1". In this example, when both conditions (i) and (ii) are true, the given query is deemed a nested query of Class 1 as noted above, e.g., a NOT operator applied to an entity type.

By way of further example, for a given query, the above statement for "Rule 3" states that (i) if there exists a given token t1 in the query which is deemed to be equal to the semantic type Entity AND (ii) there exists a given token t2 in the query which is deemed to be equal to the semantic type "aggregation" AND there exists a dependency between tokens t1 and t2 AND the position of the token t1 in the query is before the position of the token t2 in the query, then the given query is deemed to be a nested query of a class type "Class 3". In this example, the "position of" the token means the position of the corresponding word in the natural language query, wherein the position of the words is based on the sequential ordering of the words in the natural language query. For example, in the natural language query Show me stocks having highest traded value in 2018, the word "stocks" is positioned before the word "value".

The following provides a more detailed explanation of exemplary processing operations (e.g., block 212, FIG. 2) which are performed by the domain reasoning engine 147 (FIG. 1) according to an embodiment of the invention. As noted above, the domain reasoning engine 147 receives as input the processing results (e.g., nested query class label) from the nested query class type determination module 146, parses the set of tokens into the outer portion 160-1 and inner portion 160-2 of the query, and determine an associated join condition (or join clause) for joining the outer and inner portions of the query. The domain reasoning engine 147 utilizes the nested query class type information to execute a query handling process as follows.

Initially, the domain reasoning engine 147 determines the following parameters:

(i) classTypeToken=extract the token corresponding to the Nesting Class Entity;

(ii) Comparison joinOp=Extract the operator from classTypetoken; and (iii) CompareEntity CE=Extract the Argument Entity of classType token.

(Step 1) Segregate Inner and Outer Query Tokens:

(1a) Outer query tokens OTs={Token t|position(t)<positionof(classTypeToken)}

(1b) Inner query tokens ITs={Token t|position(t)>positionof(classTypeToken)}

With the process of step (1), the various entities of a given nested query are partitioned into separate entity sets across the identified comparator phrase element (or Comparison joinOP). In particular, all tokens that are positioned after the comparator phrase ID are determined to be part of the inner query, and all tokens that are positioned before the comparator phrase are determined to be part of the outer query.
(Step 2) Entity Propagations Based on Semantic Reasoning:
   (2a) Ots=OTs+{CE→Tokens}, Ots=OTs+{CE→Tokens},
   (2b) ∀t in OTs such that 3t2 in ITs with dep(t1,t2)==true
   ITs=ITs+{t}
   (2c) If(semanticType(CE) "numeric"),
   ∀t in OTs such that SemanticType(t) "Entity" && dep(t, CE→Tokens) true
   ITs=ITs+{t}
   (2d) ∀t in OTs such that SemanticType(t) "Instance" && dep(t,CE→Tokens)==true
   ITs=ITs+{t}
   (2e) ∀t in ITs such that SemanticType(t)=="Time" && t2 in ITs such that semanticType(t2)=="aggregation"
   OTs=OTs+{t}.

With the process flow of step (2), the implicit entities are shared across the inner and outer queries as per the following reasonings over semantic annotators, as implemented by the domain reasoning analysis. For example, co-reference tokens in the inner query which refer to entities in the outer query are taken into the inner query. For example, in the query "Who bought more IBM stocks than he sold" the entity "He" co-refers to the entity "Who"→"WHO" (Person.name}, so the entity He is considered to be part of both the inner and outer query. The entity on which the join condition is mentioned, is preferably shared across both the inner and outer queries.

If the comparison entity is a numeric Property, its dependent entity from the outer query is considered to be part of the inner query. In addition, any instance Value in the outer query which has functional relation to the comparison entity is preferably considered also to be part of the inner query. For example, with the query "Who bought more IBM stocks than he sold", the entity "IBM" is an instance value which "owns" Stocks, so "IBM" is carried to the inner query as well.

If the inner query contains a time phrase without any aggregation, the time phrase is preferably shared by both the inner and outer queries. For example, with the query "Show me everyone who bought and sold same stock in 2017", the element "in 2017" should be included (shared) across both the inner and outer queries. By way of further example, with the query "Show me all transactions with price higher than average selling price in 2017", the element "in 2017" is specific only to the inner query.
(Step 3) Assign Join Type by Considering the Operation and Argument Datatypes:
   if(joinOp ">" ||"<")
     If(semanticType(CE)!="Numeric")
       If(CE is a concept with a measure property)
         CE=CE.getMeasure( )
       Else
         CE=Count(CE)
   If(joinOp=="Equal" && semanticType(CE)=="Entity")
     joinOp="IN"
   If(joinOp=="NotEqual" && semanticType(CE)=="Entity")
     joinOp="NOT IN"

With the process flow of step (3), a Join entity can be asserted as per the following intelligent reasonings. For example, a join entity mapped to a non-numeric property is only used during "IN", "NOT IN" operations. If the join entity refers to two different properties in different subqueries: (i) they can be used in "<", ">", "=" iff they are both numeric, and (ii) they can be used in "IN" or "NOT IN" iff they are sibling concepts (i.e. children of same parent).

If an operation such as ">", "<", "=" has a non-numeric property for the join Entity, it should be converted as per the following rules: (i) if it is a concept having measure, then the aggregate function SUM(Measure) should be used to perform the comparison. For example, in the query "Who had more transactions than John Doe in 2017?" the operation Sum(Transaction.amount) is utilized. On the other hand, if it is a Concept having no measure/non numeric property, the aggregate function Count(Concept.id) is preferably used to perform the comparison. For example, in the query "Who bought more IBM Stocks than they sold", the element "more Stocks" can be determined by utilizing the aggregate function Count(Stocks). Moreover, implicit parameters shared by the inner and outer queries can be asserted equal unless they are join entity OR indexed values. The process can generate two different selection sets for the inner and outer query using the entity sets created for them.
(Step 4) Interpret Outer and Inner Query Independently:
   Outer Query OQ=Interpret Outer Query (OTs, O)
   Inner Query IQ=Interpret Inner Query (ITs, O)
   Return OQ, IQ, {CE, joinOp}

The entity sets generated for the inner and outer queries and the associated join condition are passed to the query interpreter module 148. In one embodiment, the query interpreter module 148 interprets the outer and inner query sets, and if the query is determined to be a nested query, the inner query interpretation is inserted as a nested subgraph of outer query interpretation.

The following examples illustrate a process flow implemented by the nested query processing module 142 to determine if a natural language query comprises a nested query. In a first example, assume a natural language query "Who purchased stock in 2nd quarter of 2016 which has gone up in value." The nested query detection process will determine that the query comprises a "comparison" element—"gone up" and that the associated comparison entity "value" is a non-literal numeric value. Then, a domain reasoning process is implemented as follows.
   (Step 1) Find the comparison entity: value.
   (Step 2) Find the comparison: greater than (Gone up).
   (Step 3) Create two subqueries across the tokens corresponding to the matched pattern. In particular, the set of outer query entity tokens is determined to be: Who purchased stock in 2nd quarter 2016. The set of inner query entity tokens is determined to be: gone up in value. As for outer to inner entity flows: Stock—has a functional relation with the join entity Value. As for inner to outer entity flows: comparison entity (Value) is part of both subqueries.
   (Step 4) Form two individual subqueries and join them with the following constraints. The shared entities (Stock) are asserted equal for both subqueries. The comparison operator is applied over the comparison Entity (Value).

In a second example, assume a natural language query "Who all bought more IBM stocks than they sold in 2017." The nested query detection process will determine that the query comprises a "comparison" element—"more . . . than" and that the associated comparison entity "stock" is a non-literal non-numeric value. Then, the domain reasoning analysis is implemented as follows.
   (Step 1) Find the comparison Entity: Stock.
   (Step 2) Find the comparison operator: >=(More than). With this process, the aggregate function (Count(Stock)) is utilized to perform the compare operation.
   (Step 3) Create two subqueries across the tokens corresponding to the matched pattern. In particular, the set of outer query entity tokens is determined to be: "Who all bought more IBM stock". The set of inner query entity tokens is determined to be: "they sold in 2017". The entities for each subquery are then found as follows. The comparison entity (Stock) is part of both subqueries. As for the outer to inner shared Entities, the entity Who (Co-reference), and the entity IBM (instance value having a functional relation with Stock) are shared. As for the inner to outer shared entities, "in 2017" is part of both subqueries.

(Step 4) Form two individual subqueries and join them with the following constraints. The shared entities (Who) is asserted equal for both subqueries. The comparison operator is applied over the comparison entity (Value).

Embodiments of the invention include a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Embodiments of the invention are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

These concepts are illustrated with reference to FIG. 3, which shows a computing node 10 comprising a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 3:
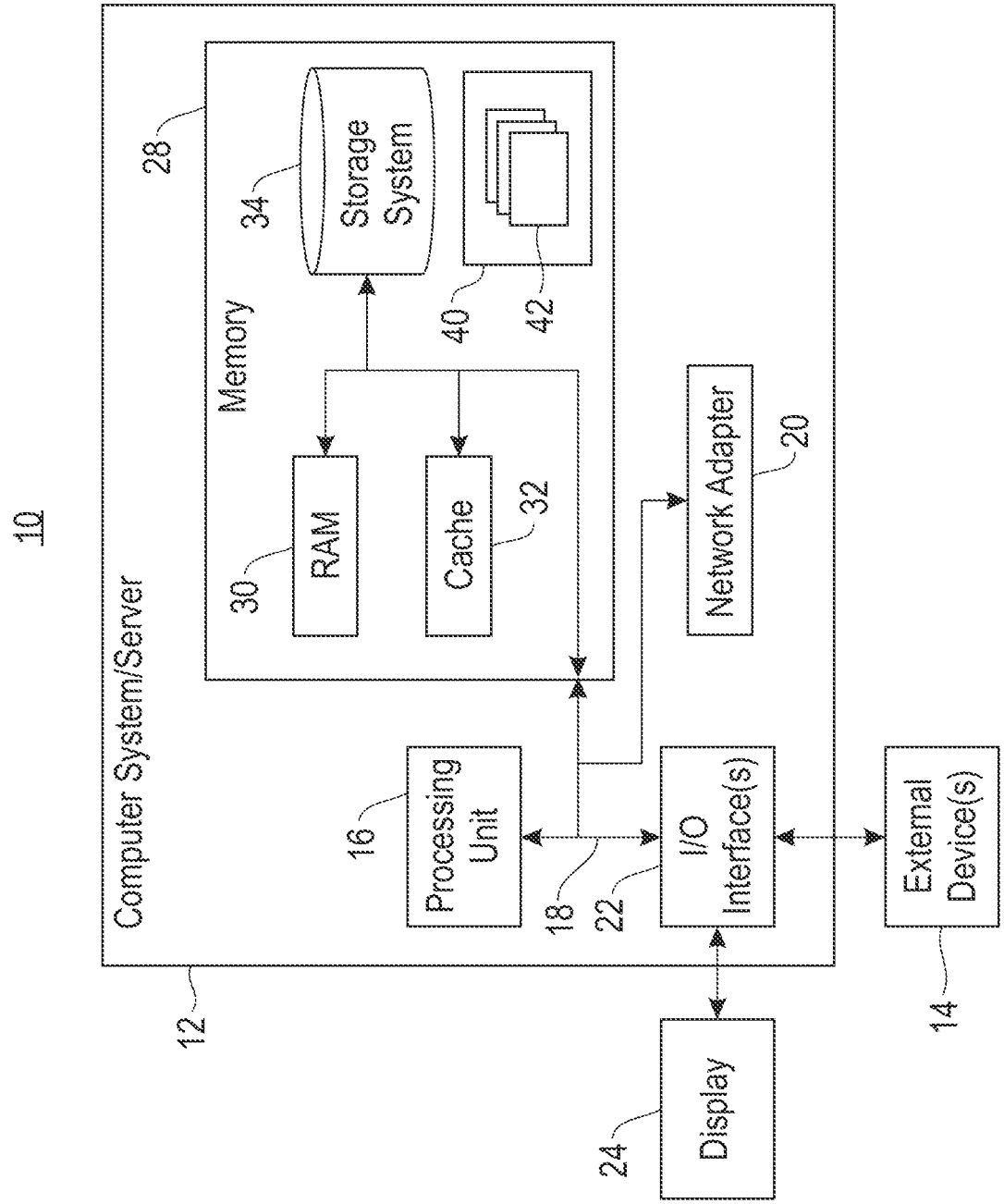
FIG. 3 is a system diagram of an exemplary computer system on which at least one embodiment of the invention can be implemented.

In FIG. 3, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 typically includes a variety of computer system readable media. Such media may be any available media that is accessible by computer system/server 12, and it includes both volatile and non-volatile media, removable and non-removable media.

The system memory 28 can include computer system readable media in the form of volatile memory, such as random-access memory (RAM) 30 and/or cache memory 32. The computer system/server 12 may further include other removable/non-removable, volatile/nonvolatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As depicted and described herein, memory 28 may include at least one program product having a set (e.g., at least one) of program modules that are configured to carry out the functions of embodiments of the invention.

The program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
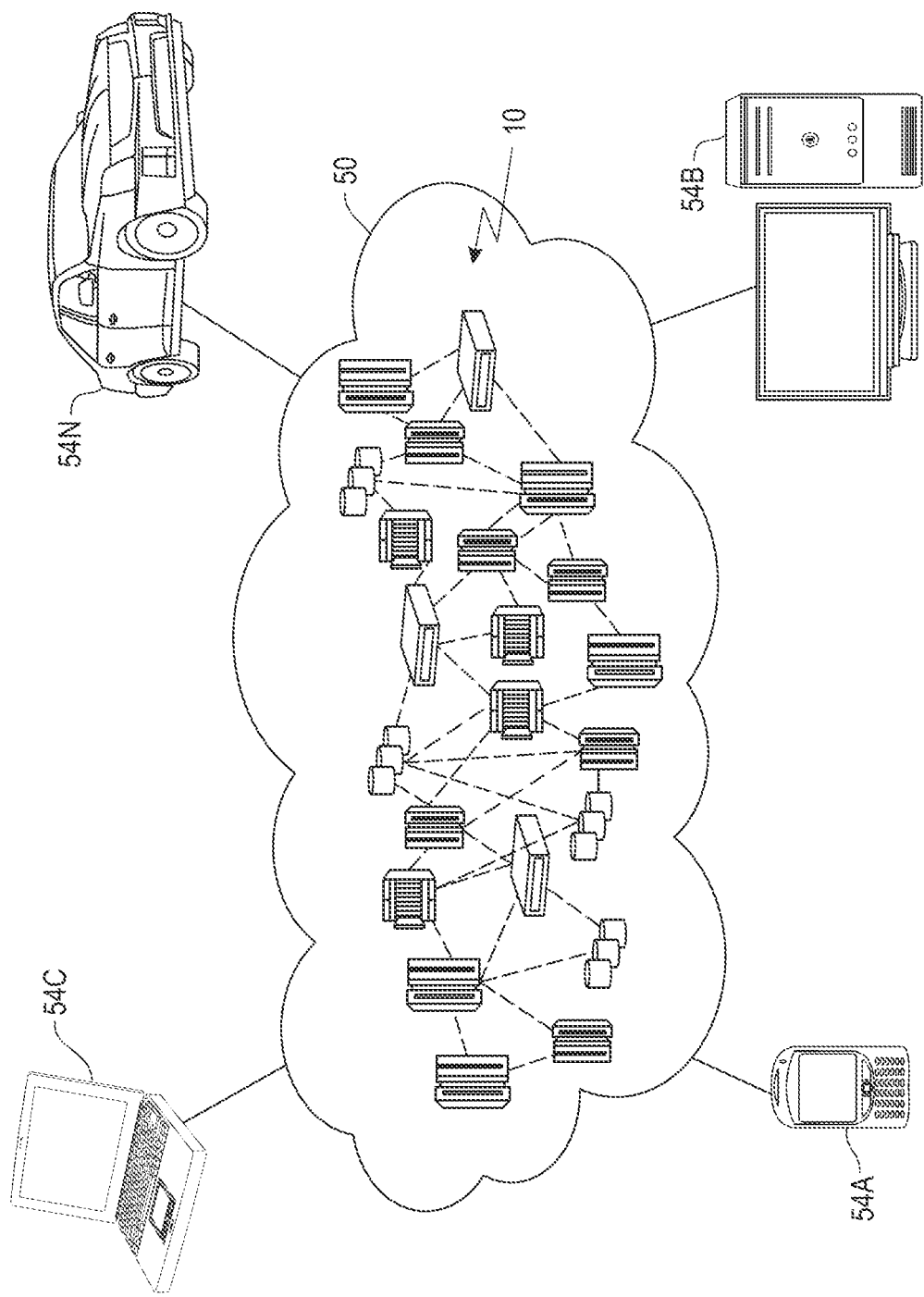
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
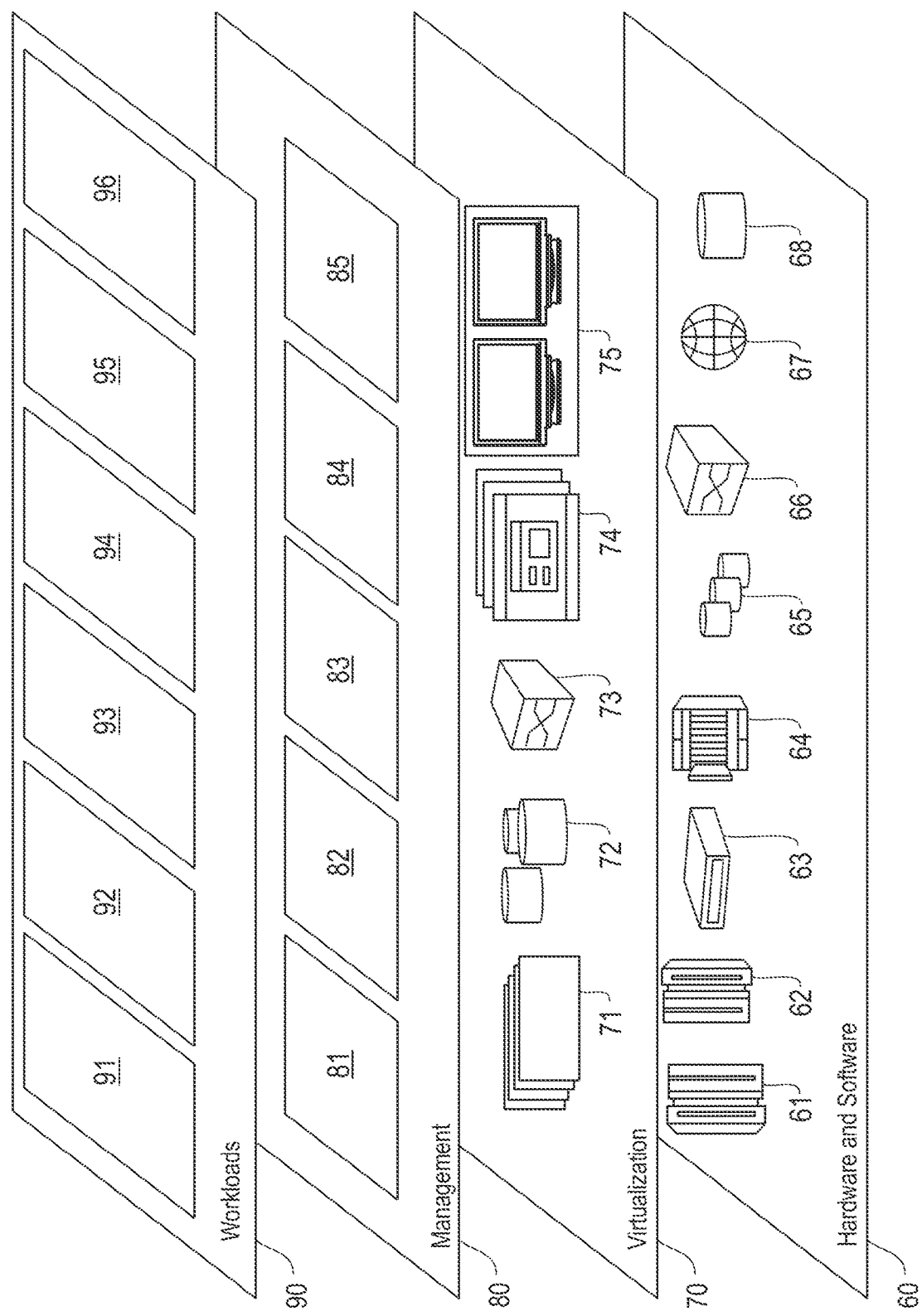
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and various functions implemented by the data processing platform 130 in FIG. 1, and in particular, the various functions of the system modules 140 and 150 of the computing platform 130, as discussed above to provide NLIDB services to various users and entities.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

Although exemplary embodiments have been described herein with reference to the accompanying figures, it is to be understood that the invention is not limited to those precise embodiments, and that various other changes and modifications may be made therein by one skilled in the art without departing from the scope of the appended claims.

What is claimed is:

1. A computer-implemented method comprising:
receiving a natural language query for obtaining information from a database;
converting the natural language query into a semantic representation which comprises tokens that correspond to elements of a database schema of the database, wherein said converting comprises annotating each of the tokens with a semantic label and determining one or more dependencies between given ones of the tokens;
processing the semantic representation of the natural language query using a reasoning engine to determine that the semantic representation of the natural language query comprises a nested query;
determining a class type, from among a plurality of class types, of the nested query based at least in part on the annotated tokens and the determined dependencies;
partitioning the tokens into separate sets corresponding to an inner query portion and an outer query portion based at least in part on the determined class type;
determining (i) entities to be shared by (a) the inner and (b) the outer query portions, and (ii) a join condition to join the inner query portion to the outer query portion, wherein said determining comprises applying semantic reasoning to the separate sets of tokens to determine the entities to be shared; and
generating a database query to access the database, wherein the database query is representative of the natural language query, and wherein the database query is generated based on (i) the outer and inner query portions of the semantic representation of the natural language query and (ii) a join clause corresponding to the join condition for joining for the outer and inner query portions of the semantic representation of the natural language query.

2. The computer-implemented method of claim 1, wherein the database comprises a relational database and wherein the database query comprises a structured query language statement.

3. The computer-implemented method of claim 1, wherein the determined class type comprises a not operator applied to an entity type.

4. The computer-implemented method of claim 1, wherein the determined class type comprises count operator applied on entities with a condition on an aggregation result.

5. The computer-implemented method of claim 1, wherein the determined class type comprises a plurality of entity retrievals based on a condition equating to an aggregation result.

6. The computer-implemented method of claim 1, wherein the determined class type comprises an entity equality enforced by the inner and outer query portions.

7. The computer-implemented method of claim 1, wherein the determined class type comprises an entity inequality enforced by the inner and outer query portions.

8. The computer-implemented method of claim 1, wherein the determined class type comprises comparing results between two subqueries.

9. The computer-implemented method of claim 1, wherein the determined class type comprises a comparison between the same entity from two subqueries.

10. An article of manufacture comprising a computer readable storage medium having program instructions embodied therewith, wherein the program instructions are executable by a computer to perform a method comprising:
receiving a natural language query for obtaining information from a database;
converting the natural language query into a semantic representation which comprises tokens that correspond to elements of a database schema of the database, wherein said converting comprises annotating each of the tokens with a semantic label and determining one or more dependencies between given ones of the tokens;
processing the semantic representation of the natural language query using a reasoning engine to determine that the semantic representation of the natural language query comprises a nested query;
determining a class type, from among a plurality of class types, of the nested query based at least in part on the annotated tokens and the determined dependencies;
partitioning the tokens into separate sets corresponding to an inner query portion and an outer query portion based at least in part on the determined class type;
determining (i) entities to be shared by (a) the inner and (b) the outer query portions, and (ii) a join condition to join the inner query portion to the outer query portion, wherein said determining comprises applying semantic reasoning to the separate sets of tokens to determine the entities to be shared; and
generating a database query to access the database, wherein the database query is representative of the natural language query, and wherein the database query is generated based on (i) the outer and inner query portions of the semantic representation of the natural language query and (ii) a join clause corresponding to the join condition for joining for the outer and inner query portions of the semantic representation of the natural language query.

11. The article of manufacture of claim 10, wherein the database comprises a relational database and wherein the database query comprises structured query language statement.

12. The article of manufacture of claim 10, wherein the determined class type comprises a not operator applied to an entity type.

13. The article of manufacture of claim 10, wherein the determined class type comprises count operator applied on entities with a condition on an aggregation result.

14. The article of manufacture of claim 10, wherein the determined class type comprises a plurality of entity retrievals based on a condition equating to an aggregation result.

15. The article of manufacture of claim 10, wherein the determined class type comprises an entity equality enforced by the inner and outer query portions.

16. The article of manufacture of claim 10, wherein the determined class type comprises an entity inequality enforced by the inner and outer query portions.

17. The article of manufacture of claim 10, wherein the determined class type comprises comparing results between two subqueries.

18. The article of manufacture of claim 10, wherein the determined class type comprises a comparison between the same entity from two subqueries.

19. A system, comprising:
at least one processor; and
at least one memory comprising computer program code, wherein the at least one memory and the computer program code are configured to, with the at least one processor, cause the system to at least:
receive a natural language query for obtaining information from a database;
convert the natural language query into a semantic representation which comprises tokens that correspond to elements of a database schema of the database, wherein said converting comprises annotating each of the tokens with a semantic label and determining one or more dependencies between given ones of the tokens;
process the semantic representation of the natural language query using a reasoning engine to determine that the semantic representation of the natural language query comprises a nested query;
determine a class type, from among a plurality of class types, of the nested query based at least in part on the annotated tokens and the determined dependencies;
partition the tokens into separate sets corresponding to an inner query portion and an outer query portion based at least in part on the determined class type;
determine (i) entities to be shared by (a) the inner and (b) the outer query portions, and (ii) a join condition to join the inner query portion to the outer query portion, wherein said determining comprises applying semantic reasoning to the separate sets of tokens to determine the entities to be shared; and
generate a database query to access the database, wherein the database query is representative of the natural language query, and wherein the database query is generated based on (i) the outer and inner query portions of the semantic representation of the natural language query and (ii) a join clause corresponding to the join condition for joining for the outer and inner query portions of the semantic representation of the natural language query.

20. A computer-implemented method comprising:
receiving a natural language query for obtaining information from a database;
parsing the natural language query into a set of tokens;
mapping the tokens to ontology elements which represent schema elements of the database;
performing a semantic parsing process to generate semantic information for the tokens, wherein the semantic information comprises (i) semantic type labels assigned to the tokens and (ii) token dependency information regarding determined dependencies between the tokens based on the semantic type labels;
utilizing the semantic information of the tokens to determine that the natural language query comprises a nested query, and to determine a class type label of the nested query;
utilizing (i) the semantic information of the tokens and (ii) the class type label of the nested query to determine a set of tokens which belong to an inner query portion and a set of tokens which belong to an outer query portion of the nested query, and a join condition to join the inner query portion and the outer query portion;
generating a logical form of a nested database query based on (i) the inner query portion, (ii) the outer query portion, and (iii) the join condition; and
generating a structured query language (SQL) nested database query based on the logical form of the nested database query.

\* \* \* \* \*